(12) United States Patent
Ebeling et al.

(10) Patent No.: US 8,263,507 B2
(45) Date of Patent: Sep. 11, 2012

(54) CELLULOSE CARBAMATE SPINNING SOLUTION, METHOD FOR PRODUCING A CELLULOSE CARBAMATE NONWOVEN, AND USE OF THE SAME

(75) Inventors: Horst Ebeling, Premnitz (DE); Hans-Peter Fink, Teltow (DE)

(73) Assignee: Fraunhofer-Gesellschaft zur Forderung der angewandten Forschung, e.V., Munich (DE)

( * ) Notice: Subject to any disclaimer, the term of this patent is extended or adjusted under 35 U.S.C. 154(b) by 648 days.

(21) Appl. No.: 12/419,979

(22) Filed: Apr. 7, 2009

(65) Prior Publication Data
US 2009/0258561 A1 Oct. 15, 2009

(30) Foreign Application Priority Data
Apr. 14, 2008 (DE) .................. 10 2008 018 746

(51) Int. Cl.
*C08L 1/10* (2006.01)
*D04H 3/08* (2006.01)
*D04H 3/00* (2012.01)

(52) U.S. Cl. ............... 442/401; 106/170.1; 106/170.19; 106/170.28

(58) Field of Classification Search ............... 106/170.1, 106/170.19, 170.28; 442/401
See application file for complete search history.

(56) References Cited

U.S. PATENT DOCUMENTS

| | | | |
|---|---|---|---|
| 3,767,756 A | 10/1973 | Blades | |
| 3,833,438 A | 9/1974 | Kaneko et al. | |
| 4,144,080 A | 3/1979 | McCorsley, III | |
| 4,404,369 A | 9/1983 | Huttunen et al. | |
| 5,216,144 A | 6/1993 | Eichinger et al. | |
| 5,607,639 A | 3/1997 | Zikeli et al. | |
| 5,968,433 A | 10/1999 | Belch et al. | |
| 6,113,842 A | 9/2000 | Weigel et al. | |
| 6,590,095 B1 | 7/2003 | Schleicher et al. | |
| 2008/0023874 A1 | 1/2008 | Fink et al. | |
| 2008/0287025 A1* | 11/2008 | Ebeling et al. | ................ 442/400 |
| 2009/0258227 A1* | 10/2009 | Ebeling et al. | ................ 428/364 |
| 2009/0259032 A1* | 10/2009 | Ebeling et al. | ................ 536/56 |

FOREIGN PATENT DOCUMENTS

| | | |
|---|---|---|
| DE | 2830685 A1 | 2/1979 |
| DE | 4421482 A1 | 12/1995 |
| DE | 102005029793 A1 | 12/1996 |
| DE | 19757958 A1 | 7/1999 |
| DE | 102004007616 A1 | 9/2005 |
| DE | 102004031025 B3 | 12/2005 |
| EP | 0057105 A2 | 8/1982 |
| EP | 0178292 A2 | 4/1986 |
| EP | 0490870 A2 | 6/1992 |
| EP | 0662283 A1 | 7/1995 |
| EP | 0879906 A2 | 11/1998 |
| EP | 0920548 B1 | 10/2002 |
| WO | WO 95/07811 A1 | 3/1995 |
| WO | WO 95/35340 A1 | 12/1995 |
| WO | WO 2006/000197 A1 | 1/2006 |
| WO | WO 2007/000319 A1 | 1/2007 |
| WO | WO 2007/026886 A1 | 3/2007 |

OTHER PUBLICATIONS

Hu et al., "Ionische Flüssigkeit in der Synthese von Cellulose carbamat", (Synthesis of Cellulos Carbamate in Ionic Liquid), Lederchemikalien, vol. 24, No. 3, pp. 31-35 (2007)—abstract only.
Laus et al., "Ionic Liquids: Current Developments, Potential and Drawbacks for Industrial Applications", Lenzinger Berichte, 84, pp. 71-85 (2005).
Zhang, "Zellulose Lösungsmittel Progress" (Advances in Solvents of Cellulose), Polymer Journal 10 (2007)—abstract only.

* cited by examiner

*Primary Examiner* — David M Brunsman
(74) *Attorney, Agent, or Firm* — Leydig, Voit & Mayer, Ltd.

(57) ABSTRACT

The present invention relates to a cellulose carbamate spinning solution, the cellulose carbamate being dissolved in an ionic liquid. The invention relates furthermore to a method for the production of nonwovens in which the cellulose carbamate spinning solution is pressed through the holes of a nozzle bar and stretched by a multiple by means of an air flow. The formed fiber curtain is laid on a perforated conveyer belt, washed and dried. Likewise, the invention relates to nonwovens of this type and also the use thereof.

21 Claims, No Drawings

CELLULOSE CARBAMATE SPINNING SOLUTION, METHOD FOR PRODUCING A CELLULOSE CARBAMATE NONWOVEN, AND USE OF THE SAME

CROSS-REFERENCE TO RELATED APPLICATIONS

This patent application claims the benefit of DE 10 2008 018 746.1, filed Apr. 14, 2008, which is incorporated by reference.

The present invention relates to a cellulose carbamate spinning solution, the cellulose carbamate being dissolved in an ionic liquid. The invention relates furthermore to a method for the production of nonwovens in which the cellulose carbamate spinning solution is pressed through the holes of a nozzle bar and stretched by a multiple by means of an air flow. The formed fibre curtain is laid on a perforated conveyer belt, washed and dried. Likewise, the invention relates to nonwovens of this type and also the use thereof.

Nonwovens are textile fabrics in which the fabric formation is effected not by weaving or knitting but by interlocking of the fibres with subsequent fixing. Because of the versatile possibilities for use and the comparatively low production costs, in comparison with knitted and woven fabrics, nonwovens still have high annual growth rates.

The advantages of these nonwovens reside in high moisture absorption, the production methods allow high variability in density and thickness, which leads to extensive surface isotropy. From these advantageous properties there result numerous possibilities for use in medicine for hygiene products, e.g. operating theatre sheets, bed sheets, wound coverings, gauze etc., as wipes of all types in the household and as decorative nonwovens, e.g. tablecloths, serviettes etc., in the clothing industry as lining fleeces and also for technical applications, e.g. insulation jackets, cover mats etc.

Viscose fibres (regenerated cellulose fibres) are used preferably as short or staple fibres for nonwoven production. Nonwovens based on regenerated cellulose fibres, because of their property potential, have a significant proportion of the market with an expected continuing growth.

Since the viscose method, according to which still the largest part of regenerated cellulose fibres is produced, is associated with significant environmental impact (carbon disulphide, hydrogen sulphide, heavy metals) and high investment costs, efforts have already been made for years to replace the viscose method by alternative methods. Methods have been developed on the basis of direct dissolving of pulp in a suitable solvent or alternative derivatisation variants without carbon disulphide. These activities have extended also to the production of nonwovens made of cellulose.

The so-called "Bemliese" method, in which cotton linters are shaped into a fleece according to the cuproammonium process, is one of the first spin-bonding methods proposed for the production of cellulose nonwovens made of continuous yarns (U.S. Pat. No. 3,833,438).

The forming of melts of synthetic polymers by extrusion of the melt through fine nozzle holes into a gas flow flowing in the fibre direction, by means of which the fibre is cooled and thereby drawn and stretched to a multiple of its length, is a method for nonwoven production which has been known for a fairly long time. This process also termed "meltblown" is suitable for the production of microfibres. In the European Patent Specification EP 0 920 548 B1, the application of melt blowing also for solutions of cellulose in amine oxides, preferably N-methylmorpholine-N-oxide (NMMO), is claimed. The method is greatly influenced by the viscosity of the cellulose/NMMO solution, this is determined in turn by the polymer (cellulose), the molecular weight (DP of the cellulose) and also the concentration.

A further known, environmentally friendly method for the production of cellulose fibres and moulded articles is based on the precipitation of cellulose carbamate from a solution of this cellulose derivative in sodium hydroxide solution (EP 57 105, EP 178 292). Cellulose carbamate is formed during the conversion of cellulose with urea at increased temperature and can be dissolved in cold diluted sodium hydroxide solution.

The low solids concentration of cellulose in the spinning solution which is generally 8 to 12% is disadvantageous for the productivity of all cellulose wet spinning methods, in particular also the NMMO- and carbamate method.

Higher spinning solution concentrations are achieved by dissolving cellulose carbamate in NMMO (WO 2007/000319 A1). The high spinning solution viscosities have a disadvantageous effect in this method. The spinning solution production is effected by swelling the cellulose carbamate in a 40 to 70% NMMO/water mixture and subsequent distilling-off of water, which demands significant dissolving times and a fairly high energy requirement.

Ionic liquids have been described as a further solvent for cellulose in recent times. Ionic liquids are salts which are constructed from a cyclic, generally nitrogen-containing cation and an organic or inorganic anion and have a melting point below 100° C. Possibilities for synthesis of ionic liquids, the use as medium in chemical reactions and also as solvents for cellulose and also the formation of these solutions into fibres are described in the subsequently mentioned publication (G. Laus, G. Bentivoglio, H. Schottenberger, V. Kahlenberg, H. Kopacka, T. Röder, H. Sixta, "Ionic Liquids: Current Developments, Potential and Drawbacks for Industrial Applications" in Lenzinger Berichte, 84 (2005) 71-85).

In WO 2006/000197, a method and device for the production of moulded articles from solutions of cellulose in ionic liquids are described. The pulps are disintegrated here in water and supplied to the dissolving process in wet form. This means that the water must be removed during dissolving, as a result of which the dissolving time and the energy requirement are affected. The described spinning solutions with concentrations up to 20% have very high zero shear viscosities.

Starting herefrom, it was the object of the present invention to provide a cellulose carbamate spinning solution in which the cellulose carbamate is present in dissolved form in high concentrations. Likewise, it was the object of the present invention to provide a method for the production of a nonwoven made of cellulose carbamate using the spinning solution according to the invention. Further objects of the present invention relate to the provision of a correspondingly produced cellulose carbamate nonwoven and also possibilities for using the nonwoven.

This object preferably is achieved by the characterizing features of the present invention. Advantageous embodiments and further developments of the invention will be apparent from the description of the invention provided herein.

According to the invention, a spinning solution made of cellulose carbamate is hence provided, the cellulose carbamate being dissolved in at least one ionic liquid. According to the invention, the cellulose carbamate concentration of the spinning solution is thereby at least 15% by weight and the zero shear viscosity, measured at 100° C., is thereby in a range of 50 to 7,500 Pas.

It was shown surprisingly that cellulose carbamate dissolves in ionic liquids up to high concentrations and can be shaped to form nonwovens with high strengths. It was likewise shown surprisingly that the highly-concentrated solutions, compared to cellulose in ionic liquids and also to cellulose carbamate in NMMO, have far lower zero shear viscosities at the processing temperature.

For the production of the spinning solution according to the invention, cellulose carbamate is dissolved in an ionic liquid with agitation or kneading at temperatures above 80° C. and the resulting spinning solution is filtered.

Preferably, dried cellulose carbamate is used for production of the spinning solution and the spinning solution is formed by mechanical mixing at temperatures between 80 and 120° C., preferably between 90 and 100° C. When using water-containing cellulose carbamate, the dissolving is effected by kneading with simultaneous withdrawal of the water at reduced pressure, e.g. less than 0.9 bar.

In an advantageous embodiment, the melting point of the at least one ionic liquid is below 100° C., preferably below 75° C., particularly preferred below 50° C.

The at least one ionic liquid is thereby selected preferably from the group consisting of ammonium-, pyrazolium-, cholinium-, in 1- and 3-position alkyl- or aryl-substituted imidazolium compounds and/or mixtures hereof, in particular butyl methylimidazolium acetate, butyl methylimidazolium chloride, ethyl methylimidazolium chloride, ethyl methylimidazolium acetate, butyl ethylimidazolium acetate, butyl ethylimidazolium chloride, methyl tetradecylimidazolium chloride, butyl methylimidazolium bromide, butyl methylpyridinium chloride, butyl methylimidazolium thiocyanate, ethyl methylimidazolium thiocyanate, butyl ethylimidazolium thiocyanate, hexyl dimethylimidazolium hexafluoroborate, ethoxy methyl methylpyrrolidinium chloride, hydroxypropyl methylimidazolium acetate, hydroxypropyl methylimidazolium chloride and/or butyl methylpyridinium chloride.

Further advantages are produced if the cellulose carbamate has a $DP_{cuoxam}$ of 150 to 170, preferably of 250 to 550.

It is likewise preferred if the cellulose carbamate has a substitution degree $DS_{carbamate}$ of 0.1 to 1, preferably of 0.2 to 0.6.

It must be emphasised as a particular advantage of the present invention that high concentrations of cellulose carbamate in solution can be set by dissolving the cellulose carbamate in an ionic liquid. The cellulose carbamate concentration can thus assume high concentration values, advantageously between 20 and 50% by weight, further preferred between 20 and 40% by weight, particularly preferred between 20 and 30% by weight.

Further advantages of the spinning solution according to the invention can be seen in the fact that, despite the high cellulose carbamate content, low zero shear viscosities are produced. Preferred ranges of the zero shear viscosity, measured at 100° C., are thereby in the range of 50 to 5,000 Pas, preferably of 150 to 2,500 Pas and particularly preferred of 250 to 1,250 Pas.

According to the invention, a method for the production of a cellulose carbamate nonwoven is likewise provided, wherein a spinning solution according to the invention is extruded in a melt blowing process through a nozzle block with at least 20 nozzle holes, the fibres emerging from the nozzle block are stretched by a temperature-controllable air flow and also are coagulated by spraying with a coagulation liquid and subsequently either
a) the fibres are formed as continuous fibres and a randomly-distributed web is formed therefrom, or
b) the fibres are formed as fibres with a finite length and a randomly-distributed web is produced therefrom.

In principle, the formation of the fleece from short fibres, staple fibres or continuous yarns is possible. The formation of the web for cut fibres is effected according to the dry- or also wet fleece method. In the case of the former, the staple fibres delivered in bale form are combed to form a fleece by means of carding or teasing and laid on a belt. In the case of the wet fleece method, the formation of the web is effected by applying a suspension comprising fibre and water on a perforated screen belt with subsequent pressing out of the water. The formed fleeces can be bonded further then by needling, thermal and/or chemical treatment or also by means of a water jet.

In the production of spun nonwovens, direct linking of spinning and fleece formation process is effected. Both melt and dry spinning methods and also wet spinning methods are suitable for fleece formation on the basis of continuous fibres. A large number of fibre-forming polymers is known as starting materials for the nonwovens. Nonwovens made of continuous materials are preferably produced from polyester and polypropylene (melt spinning—meltblown nonwovens) and also polyacrylonitrile (wet spinning—spun laid nonwovens).

According to the melt blowing method, a solution of cellulose carbamate in an ionic liquid is preferably pressed through a nozzle block with at least 20 nozzle holes, the threads emerging from the nozzle holes are stretched and cooled by a temperature-controlled air flow, are coagulated by spraying with water or a mixture of water and ionic liquid and subsequently are laid at high speed on a perforated belt with formation of a randomly-distributed fabric in which the individual fibres are self-binding and subsequently the solvent is removed by washing with water. The formed web can be endowed with higher strength in the state before drying by water jet bonding, the surface features can be adapted to the subsequent applications by calendering and finishing.

In an advantageous embodiment of the method, the spinning solution is extruded through a nozzle block with 150 to 10,000, preferably 500 to 5,000, nozzle holes per metre.

It is thereby preferred if the diameter of the nozzle holes, independently of each other, is from 0.05 to 1 mm, preferably from 0.25 to 0.6 mm.

The extrusion of the spinning solution through the nozzle block is thereby effected preferably in a temperature range of the spinning solution in the nozzle block between 50 and 150° C., preferably from 80 to 130° C., particularly preferred from 90 to 120° C.

Advantageous effects are likewise produced if the conveyed quantity of spinning solution per nozzle hole and minute is adjusted from 0.25 to 5 g, preferably from 0.75 to 3 g.

The air flow used for withdrawing the fibres from the nozzle is heated to 100 to 190° C., preferably an air temperature of 100 to 130° C. is intended to be set in the interior of the nozzle. The pressure produced by the air flow in the interior of the nozzle is preferably at 0.03 to 3.0 bar, particularly preferred between 0.5 and 2 bar.

It is thereby preferred if water or an aqueous solution at least of one ionic liquid is used as coagulation liquid, the weight concentration of the at least one ionic liquid in the aqueous solution being preferably from 0.5 to 50% by weight, preferably from 2 to 25% by weight.

For further working of the methods produced by extrusion, optionally further method steps can be implemented. Thus for example the fibre web can be laid on a perforated belt at high speed. As a consequence, the result is interlocking of the fibres and a fleece is formed which has good mechanical properties which can be improved further by water jet bonding. The pressure of the water jet used during the water jet bonding can thereby advantageously be between 5 and 100 bar. Subsequently thereto, washing, pressing-out and/or drying of the randomly-distributed web follows. Spraying of the fibre web which forms during the extrusion with the coagulation liquid is advantageously effected at least 10 cm below the extrusion nozzle. It is likewise advantageous if the spinning solution is filtered before the extrusion.

According to the invention, a cellulose carbamate nonwoven which can be produced according to a previously described method is likewise provided.

It was now found surprisingly that nonwovens with high strength and high water absorption can be produced from solutions of cellulose carbamate in ionic liquids according to the melt blowing method, which make these fleeces particularly suitable for use in hygienic articles for medicine, for household articles but also as decorative nonwovens.

The nonwovens according to the invention can be produced by varying the regeneration conditions with a varying N-content and, as a function of the N-content, have a different water absorption capacity.

The nonwovens produced according to the claimed method have preferred basis weights between 10 and 500 g/m$^2$, further preferred between 20 and 200 g/m$^2$, have a water retention capacity, measured according to DIN 53814, of at least 100% by weight, preferably of 130 to 200% by weight and, after conditioning, strengths in the longitudinal direction of at least 100 N/m, preferably of 100 to 5,000 N/m and/or a strength in the transverse direction of at least 40 N/m, preferably of 80 to 3,000 N/m, measured according to the EDANA specification 20.2-89. Hence the fibres preferably have higher strength in the longitudinal direction than in the transverse direction.

The nonwovens according to the invention are used preferably in medicine, in particular as operating theatre sheets, bed sheets, wound coverings, gauze or cotton wool pads. The nonwovens are likewise also usable as hygienic materials or as wipes in the household. A further field of application of the nonwovens according to the invention is decorative nonwovens, in particular tablecloths, serviettes or curtains and also lining fleeces in the clothing industry.

The subject according to the invention is intended to be explained in more detail with reference to the subsequent examples without restricting the latter to the embodiments described herein.

EXAMPLE 1

20 g cellulose carbamate (DPcuox: 258, DS 0.4) are mixed with 80 g butyl methylimidazolium acetate and are dissolved with agitation at 110° C. within 0.5 hours. The resulting homogeneous dark brown solution is completely fibre-free. The viscosity of the solution, measured at 100° C., is 64 Pas.

The formed spinning solution has a cellulose carbamate content of 20%. The spinning solution at a temperature of 90° C. is filtered through a 50µ filter and pressed by means of a spinning pump through a 15 cm wide nozzle with 100 nozzle holes of the diameter 0.48 mm with a conveyed quantity of 0.9 g/hole/min. The fibres emerging from the nozzle holes are stretched by air flowing by and heated to 125° C., sprayed with a mixture of 7.5% butyl methylimidazolium acetate and 92.5% water below the nozzle and laid on a conveyer belt at a speed of 2 m/min. The formed fleece is washed, squeezed out and dried under tension allowing a shrinkage of 12%.

Fleece Parameters:

| | |
|---|---|
| Basis weight: | 67 g/m$^2$ |
| Strength longitudinally (conditioned): | 1356 N/m |
| Strength transversely (conditioned): | 1200 N/m |
| Water retention capacity (DIN 53814): | 181% |

EXAMPLE 2

30 g cellulose carbamate (DPcuox: 258, DS 0.4) are mixed with 70 g butyl methylimidazolium acetate and are dissolved in a horizontal kneader at 110° C. within 1 hour. The resulting homogeneous, dark brown solution is completely fibre-free. The viscosity of the solution, measured at 100° C., is 1210 Pas. The spinning solution at a temperature of 90° C. is filtered through a 50µ filter and pressed by means of a spinning pump through a 15 cm wide nozzle with 100 nozzle holes of the diameter 0.48 mm with a conveyed quantity of 0.9 g/hole/min. The fibres emerging from the nozzle holes are stretched by air flowing by and heated to 125° C., sprayed with a mixture of 7.5% butyl methylimidazolium acetate and 92.5% water, approx. 20 cm below the nozzle and laid on a conveyer belt at a speed of 3 m/min. The formed fleece is washed, squeezed out and dried under tension allowing a shrinkage of 12%.

Fleece Parameters:

| | |
|---|---|
| Basis weight: | 67 g/m$^2$ |
| Strength longitudinally (conditioned): | 1860 N/m |
| Strength transversely (conditioned): | 1450 N/m |
| Water retention capacity (DIN 53814): | 178% |

EXAMPLE 3

30 g cellulose carbamate (DPcuox: 258, DS 0.4) are mixed with 70 g butyl methylimidazolium acetate and dissolved in a horizontal kneader at 110° C. within 1 hour. The resulting homogeneous, dark brown solution is completely fibre-free. The viscosity of the solution, measured at 100° C., is 1210 Pas. The spinning solution at a temperature of 90° C. is filtered through a 50µ filter and pressed by means of a spinning pump through a 15 cm wide nozzle with 100 nozzle holes of the diameter 0.48 mm with a conveyed quantity of 0.9 g/hole/min. The fibres emerging from the nozzle holes at a speed of 4 m/min are stretched by air flowing by and heated to 125° C., sprayed with a mixture of 7.5% butyl methylimidazolium acetate and 92.5% water, approx. 20 cm below the nozzle and laid on a conveyer belt at a speed of 1 m/min. The formed fleece is washed, squeezed out, bonded by water jet using 3 nozzle bars at 10, 20 and 50 bar and dried under tension allowing a shrinkage of 12%.

Fleece Parameters:

| | |
|---|---|
| Basis weight: | 67 g/m$^2$ |
| Strength longitudinally (conditioned): | 2560 N/m |
| Strength transversely (conditioned): | 1850 N/m |
| Water retention capacity (DIN 53814): | 178% |

The invention claimed is:
1. Cellulose carbamate spinning solution, comprising a solution of cellulose carbamate in at least one ionic liquid, wherein the cellulose carbamate concentration of the spinning solution is at least 15% by weight and the zero shear viscosity, measured at 100° C., is in the range of 50 to 7,500 Pas.

2. The spinning solution of claim 1, wherein the at least one ionic liquid has a melting point below 100° C.

3. The spinning solution of claim 1, wherein the ionic liquid is selected from the group consisting of ammonium-, pyrazolium-, cholinium-, in 1- and 3-position alkyl- or aryl-substituted imidazolium compounds and mixtures thereof.

4. The spinning solution of claim 3, wherein the ionic liquid is selected from the group consisting of butyl methylimidazolium acetate, butyl methylimidazolium chloride, ethyl methylimidazolium chloride, ethyl methylimidazolium acetate, butyl ethylimidazolium acetate, butyl ethylimidazolium chloride, methyl tetradecylimidazolium chloride, butyl methylimidazolium bromide, butyl methylpyridinium chloride, butyl methylimidazolium thiocyanate, ethyl methylimidazolium thiocyanate, butyl ethylimidazolium thiocyanate, hexyl dimethylimidazolium hexafluoroborate, ethoxy methyl methylpyrrolidinium chloride, hydroxypropyl methylimidazolium acetate, hydroxypropyl methylimidazolium chloride, butyl methylpyridinium chloride, and mixtures thereof.

5. The spinning solution of claim 1, wherein the cellulose carbamate has a $DP_{cuoxam}$ of 150 to 750.

6. The spinning solution of claim 1, wherein the cellulose carbamate has a substitution degree $DS_{carbamate}$ of 0.1 to 1.

7. The spinning solution of claim 1, wherein the cellulose carbamate concentration is between 20 and 50% by weight.

8. The spinning solution of claim 1, wherein dried cellulose carbamate is used for the production of the spinning solution.

9. The spinning solution of claim 1, wherein water-containing cellulose carbamate is used for the production of the spinning solution and the dissolving process is implemented at a reduced pressure of less than 0.9 bar.

10. The spinning solution of claim 1, wherein the zero shear viscosity, measured at 100° C., is in the range of 50 to 5,000 Pas.

11. Method of producing a cellulose carbamate nonwoven, comprising
  (a) extruding the spinning solution of claim 1 in a melt blowing process through a nozzle block with at least 20 nozzle holes;
  (b) stretching the fibres emerging from the nozzle block in (a) by a temperature-controllable air flow;
  (c) coagulating the fibres emerging from the nozzle block in (a) by spraying with a coagulation liquid; and
  (d) subsequently either
    (i) forming the fibres as continuous fibres and forming a randomly-distributed web therefrom, or
    (b) (ii) forming the fibres as fibres with a finite length and producing a randomly-distributed web therefrom.

12. The method of claim 11, wherein the spinning solution is extruded through a nozzle block with 150 to 10,000 nozzle holes per meter.

13. The method of claim 11, wherein the diameter of the nozzle holes, independently of each other, is from 0.05 to 1 mm.

14. The method of claim 11, wherein the temperature of the spinning solution in the nozzle block is adjusted between 50 and 150° C.

15. The method of claim 11, wherein the conveyed quantity of spinning solution per nozzle hole and minute is adjusted from 0.25 to 5 g.

16. The method of claim 11, wherein water or an aqueous solution of at least one ionic liquid is used as coagulation liquid.

17. The method of claim 16, wherein the weight concentration of the at least one ionic liquid in the aqueous solution is from 0.5 to 50% by weight.

18. Cellulose carbamate nonwoven, produced by the method of claim 11.

19. The nonwoven of claim 18, wherein the nonwoven has a basis weight of 10 to 500 $g/m^2$.

20. The nonwoven of claim 18 wherein the nonwoven has a water retention capacity, measured according to DIN 53814, of more than 100% by weight.

21. A hygiene product, an operating theatre sheet, a wound covering, a bandage material, a gauze, a cotton wool pad, a cloth, a bed sheet, a household cloth, a wipe, a sponge, a decorative nonwoven, serviettes, table covers, a curtain, clothing a lining, an insulation jacket, a reinforcing material, a filter material, a precursor for activated carbon fibre fabrics, or a covering mat comprising the nonwoven of claim 18.

* * * * *